(12) United States Patent
Badana et al.

(10) Patent No.: US 11,128,780 B1
(45) Date of Patent: Sep. 21, 2021

(54) METHODS AND SYSTEMS FOR MANAGING ONE OR MORE OFFICE DEVICES DURING AN EMERGENCY IN AN ORGANIZATION

(71) Applicant: XEROX CORPORATION, Norwalk, CT (US)

(72) Inventors: Shanmukha Teja Badana, Amadalvalasa Mandal (IN); Pedireddy Devi, Kirlampudi (IN); Sai Praneeth Kannegolla, Eluru (IN); Srinivasarao Bindana, Kakinada (IN)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 17/128,488

(22) Filed: Dec. 21, 2020

(51) Int. Cl.
*G06F 3/12* (2006.01)
*H04N 1/44* (2006.01)
*H04N 1/00* (2006.01)

(52) U.S. Cl.
CPC ....... *H04N 1/4433* (2013.01); *H04N 1/00477* (2013.01)

(58) Field of Classification Search
None
See application file for complete search history.

(56) References Cited

U.S. PATENT DOCUMENTS

| | | | |
|---|---|---|---|
| 9,179,105 B1* | 11/2015 | Zeira | H04N 7/183 |
| 2008/0177678 A1* | 7/2008 | Di Martini | G01D 4/002 705/412 |
| 2013/0214603 A1* | 8/2013 | Tanaka | H02J 9/061 307/66 |
| 2015/0039673 A1* | 2/2015 | Shibukawa | H04L 67/12 709/202 |
| 2016/0150122 A1* | 5/2016 | Hayama | H04N 1/0084 380/243 |
| 2016/0156787 A1* | 6/2016 | Kikuchi | H04N 1/00063 358/1.13 |
| 2018/0188680 A1* | 7/2018 | Kato | G06F 3/1221 |
| 2018/0257413 A1* | 9/2018 | Aoyagi | H04N 1/00108 |
| 2018/0309627 A1* | 10/2018 | Yarbrough | H04L 12/2825 |
| 2020/0117409 A1* | 4/2020 | Ohashi | H04N 1/32106 |
| 2020/0213466 A1* | 7/2020 | Ochi | H04N 1/00912 |
| 2021/0029267 A1* | 1/2021 | Kondoh | H04N 1/00514 |

* cited by examiner

*Primary Examiner* — Henok Shiferaw (57) ABSTRACT

The present disclosure discloses methods and systems for managing one or more multi-function devices during an emergency in an organization. The method includes receiving one or more emergency signals from one or more sensors installed within the organization. Based on the one or more emergency signals, status of access to an organization gateway is checked to ascertain the occurrence of emergency. Based on the ascertainment, the one or more multi-function devices are automatically disabled.

18 Claims, 10 Drawing Sheets

METHODS AND SYSTEMS FOR MANAGING ONE OR MORE OFFICE DEVICES DURING AN EMERGENCY IN AN ORGANIZATION

TECHNICAL FIELD

The present disclosure relates to the field of emergency situations, specifically relates to methods and systems for managing one or more office devices during an emergency in an organization.

BACKGROUND

Emergency situations (e.g., fire outbreak) pose a serious threat to the safety of people and infrastructure in organizations. Most of the organizations implement an evacuation plan to protect its people during an emergency. For example, during a fire outbreak in a building, a fire alarm is activated that alerts people to evacuate the building immediately. Evacuating the building during emergency is a sudden event and one or more office devices (such as printers, multi-function devices, etc.) may be left ON and unattended during such events. For example, a person who is printing a document might have to leave the printed documents in middle. Another person who is scanning a document at a multi-function device (MFD) may have to leave the document at the MFD upon hearing an emergency signal.

Such sudden evacuation due to emergencies raises many concerns. For example, the already printed sheets which are left unattended or delivering printed sheets by the MFD may increase the risk in certain emergencies (for example, by providing additional flammable material in case of a fire). In another example, the document left at the MFD for scanning may be collected by another user such as emergency response personnel, thereby allowing unauthorized people to have access to potentially confidential and/or personal information of the user. Moreover, the MFD left unattended for long periods may unnecessarily keep consuming power. So, leaving these devices without stopping services overall is a security problem.

Current solutions available to manage these devices during an emergency requires an administrator to manually trigger the devices to an OFF/standby state. But sometimes the organization may have multiple MFDs placed at various locations and managing all of them could be very cumbersome and time-consuming task during emergencies. Sometimes, the administrator may not get sufficient time to turn-off all the devices while evacuating the office. Other available solutions provide a feature where printers, for example, may capture emergency from alarms but the printers do not know when the emergency ends or when the printers should resume functioning. So, there is a lack of information and such solutions do not provide end-to-end detection mechanism i.e., start of emergency and end of emergency. At times, printers may misinterpret alarm as a sign of emergency and hence there are chances of discrepancies. In this light, there is a need for systems and methods that can manage office devices in emergency situations with minimal effort.

SUMMARY

According to aspects illustrated herein, the present disclosure discloses a method for managing one or more multi-function devices during an emergency in an organization. The method includes receiving one or more emergency signals from one or more sensors installed within the organization. Based on the one or more emergency signals, status of access to an organization gateway is checked to ascertain the occurrence of emergency. Based on the ascertainment, the one or more multi-function devices are automatically disabled.

According to further aspects illustrated herein, a system for managing one or more multi-function devices during an emergency in an organization is disclosed. The system includes one or more sensors for: detecting emergency within the organization; upon detection, sending one or more emergency signals to an organization gateway access system and an office device controller; the organization gateway access system for controlling access to an organization gateway based on the one or more emergency signals; the office device controller communicatively coupled to the one or more sensors, the office device controller for: receiving the one or more emergency signals from the one or more sensors; based on the one or more emergency signals, checking status of access to the organization gateway to ascertain the occurrence of an emergency; and based on the ascertainment, disabling the one or more multi-function devices; and the one or more multi-function devices communicatively coupled to the office device controller, for performing one or more imaging functionalities.

According to furthermore aspects illustrated herein, an office device controller for managing one or more multi-function devices during an emergency in an organization is disclosed. The office device controller is for: checking status of access to an organization gateway to ascertain the occurrence of an emergency based on one or more emergency signals; and based on the ascertainment, automatically disabling the one or more multi-function devices.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

FIG. 1A shows an exemplary environment in which various embodiments of the disclosure can be practiced, while

DESCRIPTION

A few inventive aspects of the disclosed embodiments are explained in detail below with reference to the various figures. Embodiments are described to illustrate the disclosed subject matter, not to limit its scope, which is defined by the claims. Those of ordinary skill in the art will recognize a number of equivalent variations of the various features provided in the description that follows.

Non-Limiting Definitions

In various embodiments of the present disclosure, definitions of one or more terms that will be used in the document are provided below. For a person skilled in the art, it is understood that the definitions are provided just for the sake of clarity and are intended to include more examples than just provided below.

The term "multi-function device" is a single device or a combination of multiple devices, to perform one or more functions such as, but not limited to, printing, imaging, scanning, copying and so forth. The multi-function device may include software, hardware, firmware, or a combination thereof. In the context of the current disclosure, the multi-function device is provided with stopping/pausing services for emergency situations, for example, the multi-function device is provided with enable or disable features.

The term "emergency" refers to a situation when safety of people such as employees and/or infrastructure in an organization is at risk. Various examples of the emergency may include fire outbreak, physical damage, evacuation drills, a building security emergency event, a mandatory building evacuation, earthquakes, explosions, hurricanes, electric short circuits, gas leakage, or the like.

The term "emergency signal" indicates the occurrence of the emergency in the organization.

"Organization gateway" refers to entry or exit points for employees to enter in the organization or exit from the organization, respectively. The status of the organization gateway may be open (enabled) or restricted (disabled). For example, access to the organization gateway is restricted or disabled when emergency occurs. Access to the organization gateway is enabled again when emergency ends. Access to the organization gateway can be controlled by a "gateway controller" or organization gateway access system. The gateway controller may be in the form of a hardware, software, or a combination thereof.

The term "office device controller" manages/controls office devices such as multi-function devices during emergency situations. For example, the office device controller disables functioning of the multi-function device when emergency is ascertained. The office device controller enables functioning of the multi-function device when emergency ends. Similar to the gateway controller, the office device controller may be implemented in the form of hardware, software, or a combination thereof.

The term "disable the multi-function device" refers to disable/restrict functioning of the multi-function device temporarily i.e., putting the multi-function device and/or its services on hold temporarily. The term "enable the multi-function device" refers to enable functioning of the multi-function device i.e., putting the multi-function device back to work state when the emergency ends.

Overview

During emergencies, office devices such as copiers, scanner, printers, multi-function devices keep running irrespective when the emergency ends, and this may pose serious security problems or other problems as mentioned above. For example, the printer keeps printing even when the user is not around because of emergency. To address such problems, the present disclosures is provided.

The present disclosure provides methods and systems to manage office devices such as printers, scanners, copiers, multi-function devices, etc. during emergency situations in offices. Particularly, the methods and systems control office devices such that functioning of the office devices can be disabled automatically when emergency is ascertained/confirmed and functioning of the office devices can be enabled when emergency ends. Disabling and enabling functioning of the office devices can be done remotely and without requiring an administrator to manually turn on/off the devices. The methods and systems are provided in the form of an office device controller that manage the office devices by disabling or enabling them. The disclosure will be discussed with multi-function device as an example, but the disclosure can be implemented for other office devices discussed herein or later developed office devices. The methods and systems force all office devices to stop functioning in emergency situations.

Exemplary Environments

Figure 1A:
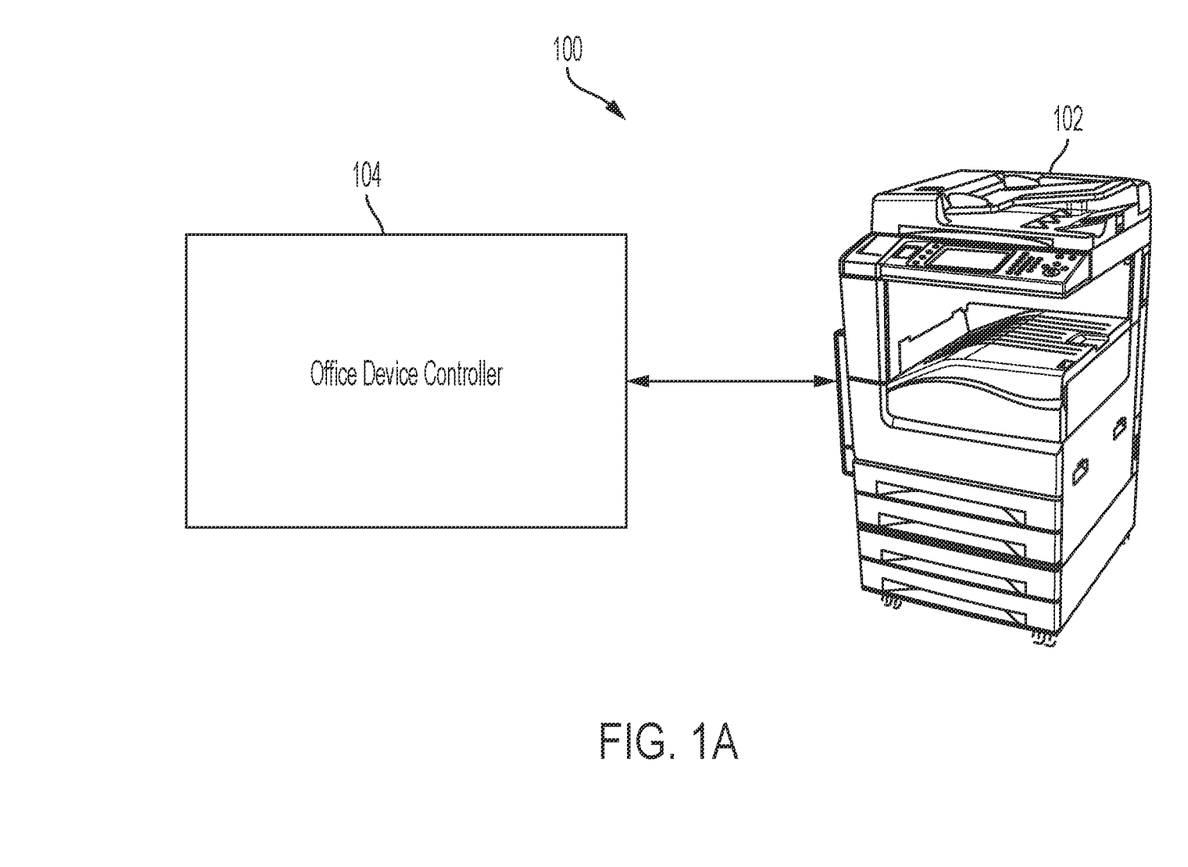

FIG. 1A shows an exemplary environment 100 in which various embodiments of the disclosure can be practiced. The environment 100 may represent an organization/office environment that includes one or more computing devices communicatively coupled to each other, one or more users/employees, one or more sensors, an organization gateway, an organization gateway access system (or gateway controller), a server communicatively coupled to each computing device and so (although not shown). For simplicity, the environment 100 is shown to include a multi-function device 102 and an office device controller 104 communicatively coupled to the multi-function device 102 via a communication network. In place of the multi-function device 102, the environment 100 may include other office devices such as a printer, a scanner, a copier, multi-function peripheral device and so on.

The communication network may be a wireless network, a wired network or a combination thereof. The communication network may be implemented as one of the different types of networks such as intranet, Local Area Network (LAN), Wide Area Network (WAN), the Internet, and the like. The communication network may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the communication network may include a variety of network devices, including routers, bridges, servers, computing devices, storage devices, and the like.

In normal operating mode, all office devices such as multi-function device 102 functions, while in emergency situations, functioning of the multi-function device 102 needs to be controlled to avoid security issues (data expose) and for other various reasons such as power saving, and so on. Various examples of emergencies may be mandate building evacuation such as mock fire drills, building security emergency event, fire outbreak, physical damage, evacuation drills, earthquakes, explosions, electric short circuits, gas leakage, and so on. For simplicity, the disclosure will be discussed with fire outbreak as an example, but the disclosure is also applicable to other types of emergencies.

The multi-function device 102 typically performs one or more imaging functionalities such as printing, copying, scanning imaging, and so on. In context of the present disclosure, the multi-function device 102 includes stopping/ controlling feature such that functioning of the multi-function device 102 can be controlled remotely. The feature can be in the form of enable and disable. The disable feature puts the multi-function device 102 to pause/idle state such that functioning of the multi-function device 102 is stopped temporarily as well as access to the multi-function device 102 is stopped temporarily. For example, all ongoing jobs such as print jobs, scan jobs, copy jobs are put on hold. The enable feature puts the multi-function device 102 back to work state such that functioning of the multi-function device 102 is resumed. For example, the jobs such as print jobs, scan jobs, copy jobs that are put on hold at the time of emergency are resumed from where they were left. As an example, if a print job A with 5 pages is submitted to the multi-function device 102 for printing and only 3 pages got printed before emergency, and printing of the job A is stopped during emergency. As soon the emergency ends, the multi-function device 102 resumes printing of remaining 2 pages of the print job A.

The office device controller 104 monitors all activities of the multi-function device 102 such as how many prints are generated, status of ongoing jobs, scan jobs and so on. In context of the current disclosure, the office device controller 104 controls functioning of the multi-function device 102 remotely in emergency situations. The office device controller 104 controls functioning of the multi-function device 102 based on status of access to an organization gateway. For example, if status of access to the organization gateway is "restricted", the office device controller 104 disables functioning of the multi-function device 102. If status of access to the organization gateway is "open", the office device controller 104 enables the functioning of the multi-function device 102. This way, offices devices such as multi-function device 102 can be controlled remotely. More structural and functional/implementation details of the office device controller 104 will be discussed in FIG. 2.

For a person skilled in the art, it is understood that the disclosure proposes a way of controlling functioning of office devices based on access to the organization gateway. And access to the organization gateway can be controlled/managed using any known methods or later developed methods, without deviating from the scope of present disclosure.

Figure 1B:
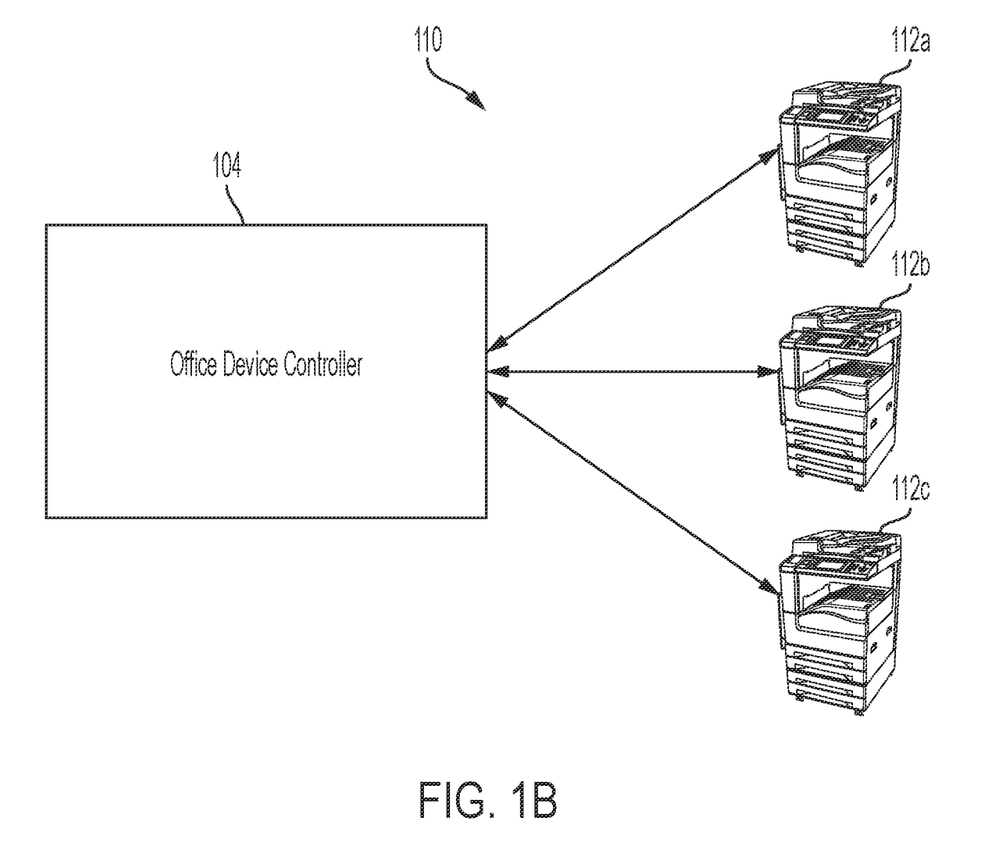
FIG. 1B shows another exemplary environment.

Although the environment 100 shows a single multi-function device 102, but the environment 110 as shown in FIG. 1B includes a group of multi-function devices such as 112a, 112b, and 112c (collectively 112) communicatively coupled to each other via a communication network. As per FIG. 1B, the office device controller 104 controls these multi-function devices 112 connected in a network. These multi-function devices 112 may be in the same facility. The facility may be the building, a floor of the building, area in the building, different buildings in a zone and so on. For example, these multi-function devices 112 may be present on $2^{nd}$ floor. Alternatively, the multi-function devices 112 may be in different facilities. For example, multi-function device 112a may be present on $2^{nd}$ floor of the building, the multi-function device 112b may be present on $5^{th}$ floor, and the third multi-function device 112c may be present on $9^{th}$ floor of the building.

Based on emergency situations, the office device controller 104 may control these multi-function devices 112 i.e., any of the multi-function devices (112a, 112b or 112c) or may control all the multi-function devices 112 together. For example, if emergency occurs on $2^{nd}$ floor of the building, then the office device controller 104 disables the multi-function device 112a and all other multi-function devices 112b and 112c may continue to perform their functions in normal mode. In another example, if emergency occurs in the whole building, then the office device controller 104 disables all multi-function devices 112a, 112b, 112c together.

As per FIGS. 1A and 1B, the office device controller 104 is shown as a separate entity, but the office device controller 104 may be a part of the multi-function device 102 and multi-function devices (112a, 112b and 112c), respectively. For example, functionalities of the office device controller 104 may be incorporated in the multi-function device such as 102. In some implementations, functionalities of the office device controller 104 may be incorporated in an organization gateway access system (shown in FIG. 2). The office device controller 104 may be a cloud-based controller that can control the multi-function device 102 or multiple multi-function devices (112a, 112b, or 112c).

Exemplary System

Figure 2:
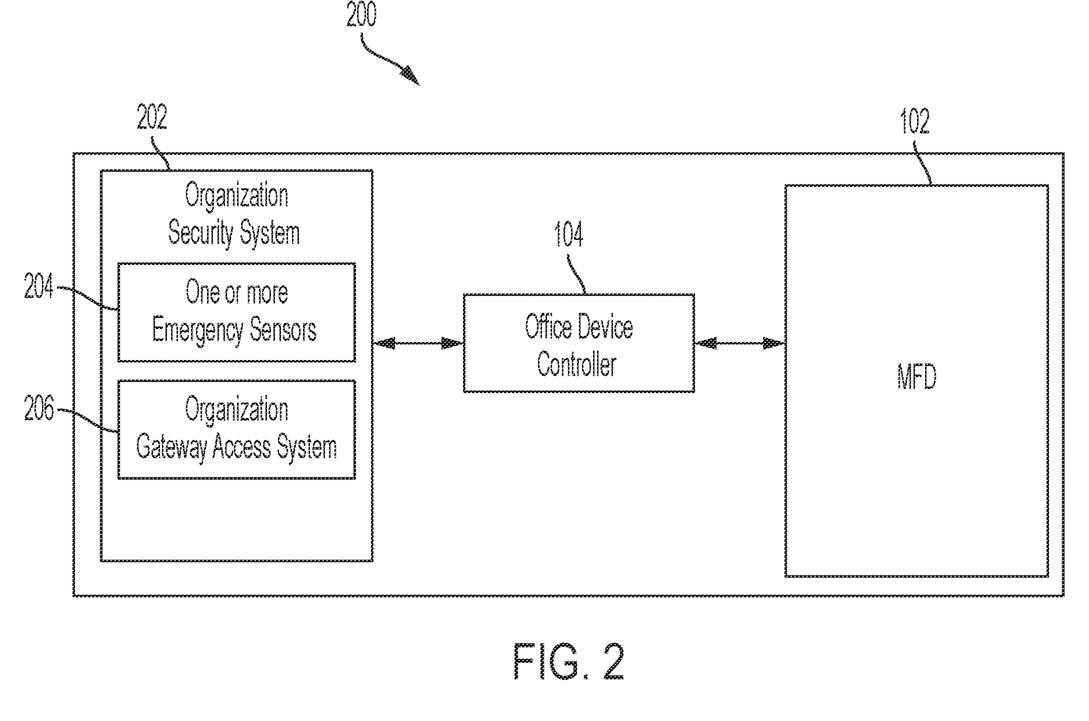
FIG. 2 shows a system for automatically managing one or more multi-function devices during emergencies in an organization.

FIG. 2 is a system 200 for automatically managing one or more office devices during emergencies in an organization. The system 200 includes an organization security system 202 and the multi-function device 102, where the organization security system 202 includes one or more emergency sensors 204 and an organization gateway access system 206 (can be referred to as gateway controller). While not shown explicitly, the multi-function device 102 may include various components such as a controller, a user interface, a scanner, and a print engine. The multi-function device 102 may include additional components required to implement the current disclosure. In context of the current disclosure, the system 200 includes the office device controller 104. The organization security system 202, the office device controller 104 and the multi-function device 102 may be communicatively coupled to each other via a communication network as discussed above or other suitable communication network as known or later developed networks.

In context of the current disclosure, the multi-function device 102 performs operations/functions based on status of access to the organization gateway (not shown). If access to the organization gateway is disabled, the multi-function device 102 goes to pause/idle state. In such state, the multi-function device 102 stops functioning temporarily. If access to the organization gateway is enabled, the multi-function device 102 performs/resumes normal operations. Here, the multi-function device 102 resumes its functioning.

The one or more emergency sensors 204 are typically installed in an organization to detect various types of emergencies, for example, fire emergency, physical damage, smoke detection, electric short circuits, etc. Various examples of the emergency sensors 204 may be fire detection and alarm sensors, smoke detection sensors, gas leakage detection sensors and so on. The emergency sensors 204 continuously sense environment in the organization to identify any emergency. Once identified, these emergency sensors 204 generate emergency signals to update other systems in the communication network. The emergency signals include details such as type of emergency, time of emergency or the like. The emergency sensors 204 send the emergency signals to the organization gateway access system 206 and the office device controller 104. Based on the emergency signals, the organization gateway access system 206 disables access to the organization gateway. In one example, the organization gateway access system 206 may include an organization gateway with electric locks, a gateway reader, and an organization gateway access controller to control electric locks of the organization gateway. The organization gateway access controller further manages access control to the organization gateway based on various user's levels and/roles. The organization gateway may include a reader such as face recognition reader, biometric reader, access card reader and so on. The gateway reader reads input in the form of face, biometric inputs, or access card information and sends the input to the organization gateway access controller for providing access to the users. The emergency sensors 204 and the organization gateway access system 206 can be communicatively coupled to each other via wired or wireless communication network. The emergency sensors 204 and the organization gateway access system 206 can be integrated into a single system to determine emergency and manage access to the organization gateway based on the emergency. As above, the organization gateway access system 206 and its functioning is exemplary in nature but the organization gateway access system 206 may be integrated in any way to determine emergencies and manage access to the organization gateway without deviating the scope of the disclosure.

In context of the current disclosure, upon receiving the emergency signals from the emergency sensors 204, the office device controller 104 checks status of access to the organization gateway to ascertain/confirm the occurrence of emergency. The office device controller 104 checks whether the status is enabled or disabled/restricted. If access to the organization gateway is disabled, the office device controller 104 further checks a category corresponding to the disabled status. Various examples of the category may be emergency, test mode, etc. If the category is emergency, the office device controller 104 proceeds further. If status of access to the organization gateway is disabled and the category is emergency, the office device controller 104 confirms the occurrence of emergency in the organization.

Once ascertained, the office device controller 104 disables the multi-function device 102 present in the organization. The office device controller 104 disables functioning of the multi-function device 102. Here, the office device controller 104 disables functionalities of the multi-function device 102 such that printing, scanning, copying is disabled. When the multi-function device 102 is disabled, the multi-function device 102 stops printing, scanning, copying, imaging, or the like temporarily. At the same time, the office device controller 104 disables access to the multi-function device 102. For example, the office device controller 104 automatically triggers force stop function protocol that stops the multi-function device 102 immediately from the remote location.

The office device controller 104 continuously checks status of access to the organization gateway to determine an end of the emergency. If the status of access to the organization gateway is found enabled, the office device controller 104 determines end of the emergency. The office device controller 104 then enables back the multi-function device 102. Here, the office device controller 104 enables functioning of the multi-function device 102 such that the multi-function device 102 resumes functioning. For example, the office device controller 104 automatically triggers force start function protocol that resumes functioning of the multi-function device 102 immediately from the remote location.

In some implementations, the office device controller 104 checks if the emergency is not ended within a pre-defined time interval such as 1 hour. In such cases, the office device controller 104 automatically shuts down the multi-function device 102 from the remote location. This is done to ensure that the multi-function device 102 is not short circuited nor burnt during such emergency.

The office device controller 104 generates a notification for users when the occurrence of the emergency is ascertained. The notification may be displayed via a user interface of the multi-function device 102. The notification may include status of the multi-function device 102 or may include a pre-defined message such as "Emergency occurs, the device is paused". In some examples, the notification may be generated for users whose jobs are submitted at the multi-function device 102 before emergency. The notification may be sent to the users via a text message. The notification may also be displayed via a user interface 216 of the multi-function device 102. The office device controller 104 also generates a notification for users when the emergency ends. The notification may include status of the multi-function device 102 or may include a pre-defined message such as "Emergency ends, the device online".

In some implementations, functionalities of the office device controller 104 can be directly incorporated in the multi-function device 102. In such cases, the multi-function device 102 directly communicates with the organization gateway access system 206 and captures access connectivity signal from the organization gateway access system 206. If it is disabled, the multi-function device 102 goes to pause/idle state. The multi-function device 102 captures access connectivity signal from the organization gateway access system 206 and if it is enabled, then the multi-function device 102 resumes and performs normal operations. In other examples, functionalities of the office device controller 104 can be directly incorporated in the organization gateway access system 206. In such cases, the organization gateway access system 206 controls functioning of the multi-function device 102 based on status of access to the organization gateway, which is determined based on emergency.

Although FIG. 2 shows a single multi-function device 102 but there can be multiple multi-function devices. Accordingly, the office device controller 104 can control multiple multi-function devices in an emergency situation.

Figure 3A:
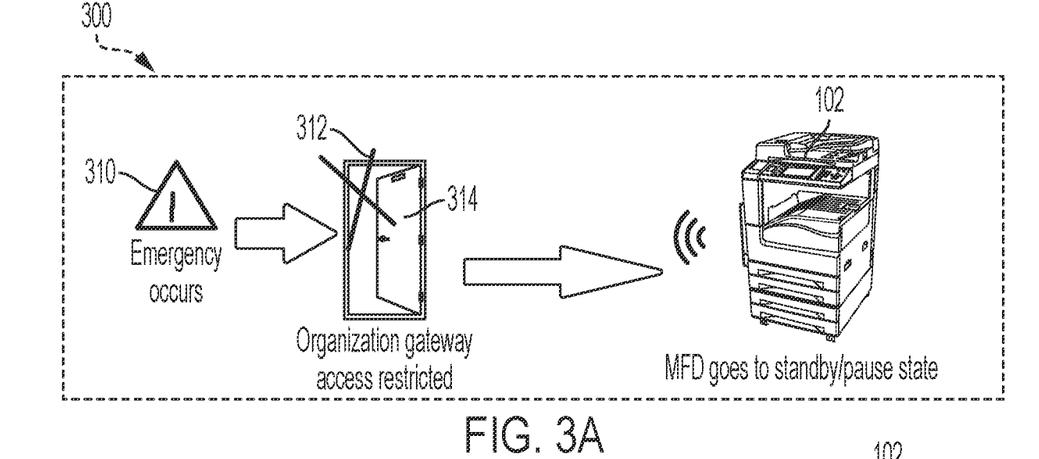
FIGS. 3A-3B show exemplary implementation of the present disclosure.
Figure 3B:
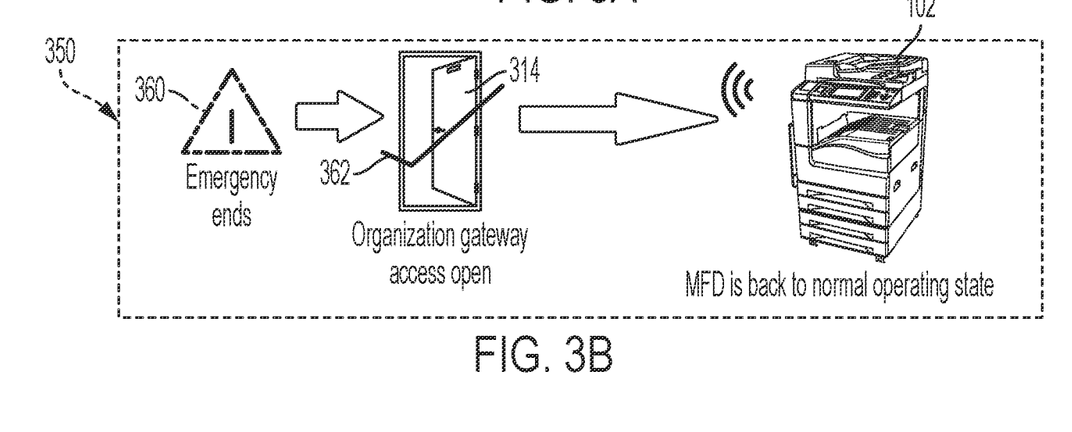
Figure 4A:
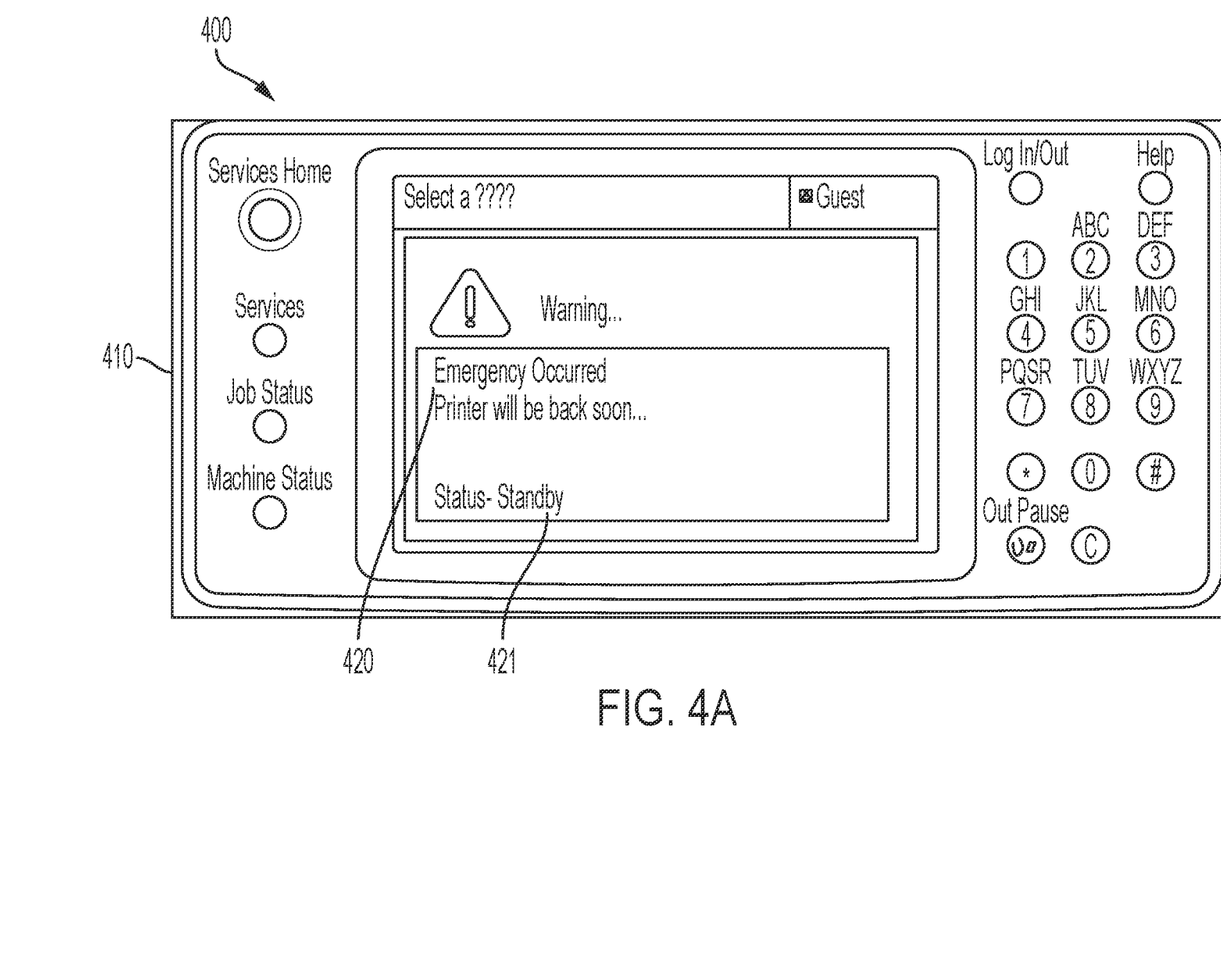
FIGS. 4A-4B show examples of notifications displayed on a user interface.
Figure 4B:
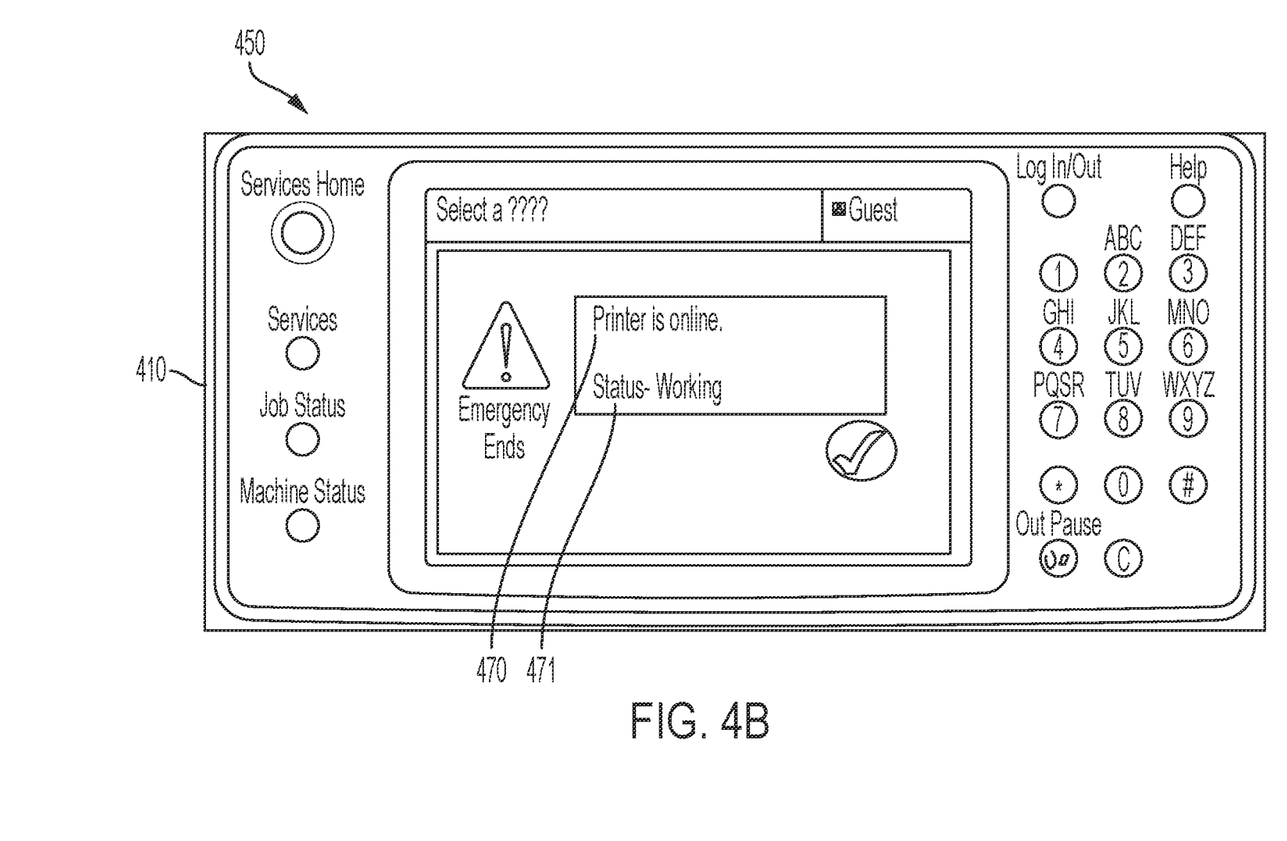

One exemplary implementation of the disclosure is shown in FIGS. 3A-3B and 4A-4B. FIG. 3A shows an implementation 300 when emergency occurs. As shown, when the emergency occurs (marked as 310), access to an organization gateway 314 is checked. In this case, access to the organization gateway 314 is restricted (marked as 312). Based on the status, the office device controller 104 communicates about the emergency to the multi-function device 102 and puts the multi-function device 102 to pause state. When emergency occurs, a pop-up message is displayed on the multi-function device 102 as shown in snapshot 400 of FIG. 4A. An exemplary message 420 such as "Emergency occurred, printer will be back soon" is displayed via a user interface 410. Similarly, status is shown as standby (marked as 421). FIG. 3B shows an implementation 350, when the emergency ends. When emergency ends (marked as 360), access to the organization gateway 314 is enabled (marked as 362). Based on the enabled status, the multi-function device 102 is back to normal operating state. When emergency ends, an exemplary pop-up message is displayed as shown in the snapshot 450 of FIG. 4B. As per FIG. 4B, the exemplary message is shown as 470 "printer is online". The exemplary status is shown as "working" (marked as 471).

Exemplary Flowchart

Figure 5:
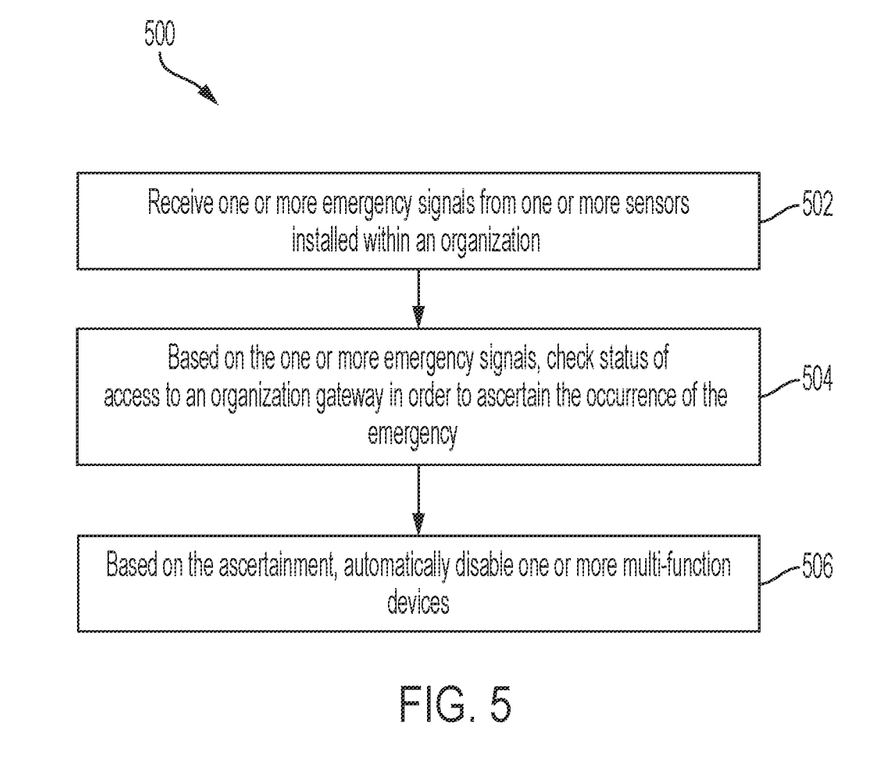
FIG. 5 is a method flowchart for automatically managing one or more multi-function devices during emergencies in an organization, in accordance with an embodiment of the present disclosure.

FIG. 5 is a method flowchart 500 for automatically managing one or more office devices such as multi-function devices during an emergency in an organization. The method can be implemented by the office device controller (such as 104) or by the multi-function device (102) itself where functionalities of the office device controller 104 as discussed above can be incorporated in the multi-function device 102. The office device controller 104 can be present at a remote location such as over cloud or can be present anywhere within the organization without limiting the scope of disclosure. Reference to other FIGs. can be made while discussing the disclosure.

In normal situations, the multi-function device performs regular operations/functionalities such as printing, scanning, copying, imaging, or other functionalities. For example, the multi-function device print jobs as per print queue and print parameters. In another example, the multi-function device scan jobs to generate scanned documents. But in case of emergency situations, the multi-function device and/or its functioning needs to be stopped temporarily to avoid data expose or to avoid further increase the risk in emergency. The method 500 proposes an exemplary way to manage such office devices, for example, the multi-function device.

The method 500 begins when an emergency occurs in an organization. For easy discussion, the emergency may be fire outbreak, but the method 500 can be implemented for any types of emergencies. The emergency is detected by one or more emergency sensors installed in the organization. For example, to detect the fire outbreak, one or more fire sensors (e.g., cameras, fire detection and alarm sensors, smoke detection and sensors) are installed in the organization. The fire sensors detect the onset of fire by sensing one or more input signals such as smoke or heat and activate output devices such as alarms, lights, etc. Any types of sensors can be used to detect emergency as known or later developed. The sensors detect emergency and generates one or more emergency signals. Then, the sensors send emergency signals to other systems in the organization such as gateway controller and/or the office device controller.

At 502, one or more emergency signals are received from one or more sensors. The emergency signals indicate occurrence of an emergency in the organization such as fire outbreak.

At 504, based on the one or more emergency signals, status of access to an organization gateway is checked to ascertain occurrence of the emergency in the organization. The status of the organization gateway may be "Enabled" or "Disabled". These are exemplary statuses, but the status can be "Access Open", or "Access Restricted" to indicate a normal situation or emergency situation, respectively. The status "Enabled" indicates a normal situation where all office devices in the organization perform their regular operations and employees have access to all the devices and the organization gateway for entry and exit to the organization. For example, if access to the organization gateway is "Enabled", then it is identified as normal situation. But if access to the organization gateway is "Disabled", then it is identified as an emergency. In order to ensure it is emergency, a category is further checked under which the organization gateway is marked "Disabled". If the category is emergency, occurrence of the emergency is ascertained, and the method 500 proceeds further. This is determined as start of emergency.

Then, at 506, one or more multi-function devices are automatically disabled. Here, the multi-function devices are disabled such that functioning of the multi-function devices and access to the multi-function devices are disabled. Various functionalities such as printing, scanning, copying or other imaging functionalities are disabled temporarily till the emergency ends. The multi-function devices immediately stop printing, scanning, or copying ongoing jobs. At the same time, access to the multi-function devices is disabled. For example, if a user tries to access any of the multi-function devices, he may not be able to access and use the multi-function devices. The multi-function devices are disabled till the emergency ends.

To determine the end of emergency, status of access to the organization gateway is continuously checked. Alternatively, status of access to the organization gateway may be checked after a pre-defined time such as 3 seconds, 10 minutes, 30 minutes. Based on continuously checking, when status of access to the organization gateway is found changed from "Disabled" to "Enabled" status, it is determined as end of emergency. Then, the multi-function devices are enabled back such that multi-function devices restart functioning and can perform all functionalities such as printing, scanning, copying, or other imaging functionalities. And further, the multi-function devices resume execution of jobs. For example, if there are 2 print jobs in a print queue before the emergency, then, the multi-function devices start resuming printing of these 2 jobs. Also, users can access the multi-function devices to perform any tasks such as checking progress of their jobs, etc.

The method 500 includes generating a notification for users when occurrence of the emergency is ascertained. For example, the notification may be sent to all users who submitted their jobs for execution at the multi-function devices. The notification indicates the occurrence of the emergency and further notifies the users about their respective jobs on hold for the pre-defined time interval. The notification may be sent to an owner of the organization, admin of the organization etc. The notification may be sent in form of an email, text message, a IVR call, WhatsApp message or the like.

In some cases, when a user tries to access the multi-function device, a pre-defined notification is shown to the user via a user interface of the multi-function device. The notification indicates the occurrence of the emergency and further shows the status of the multi-function device as standby, pause, offline and so on.

A notification is generated for users when the end of emergency is determined. The notification indicates that functioning of the multi-function devices is resumed and may indicate status as online. The notification may be displayed via a user interface of the multi-function devices. This way, the multi-function devices are managed in emergency situations.

Exemplary Scenarios

Figure 6A:
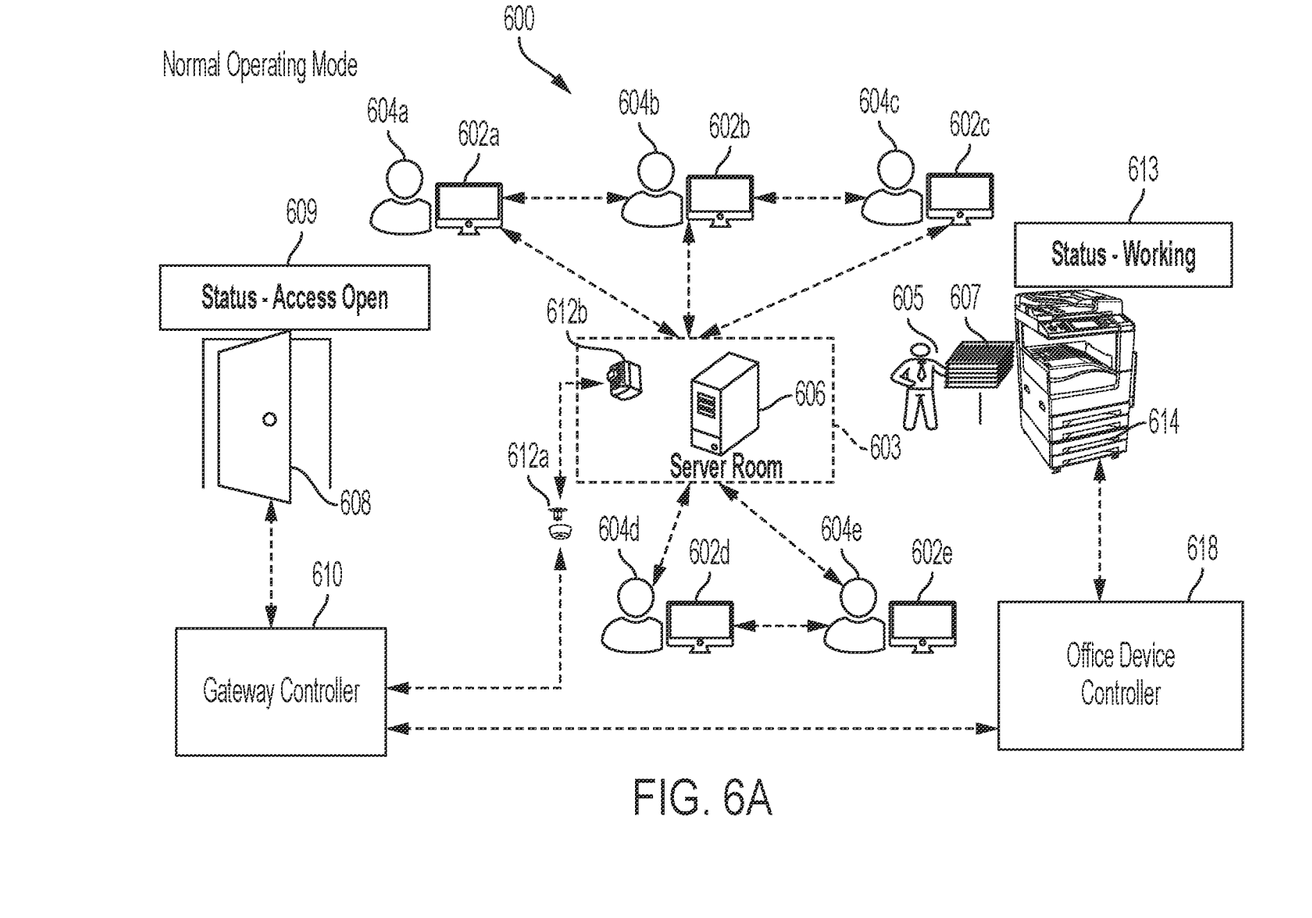
FIGS. 6A-6C show exemplary implementation of the disclosure in an office environment.
Figure 6B:
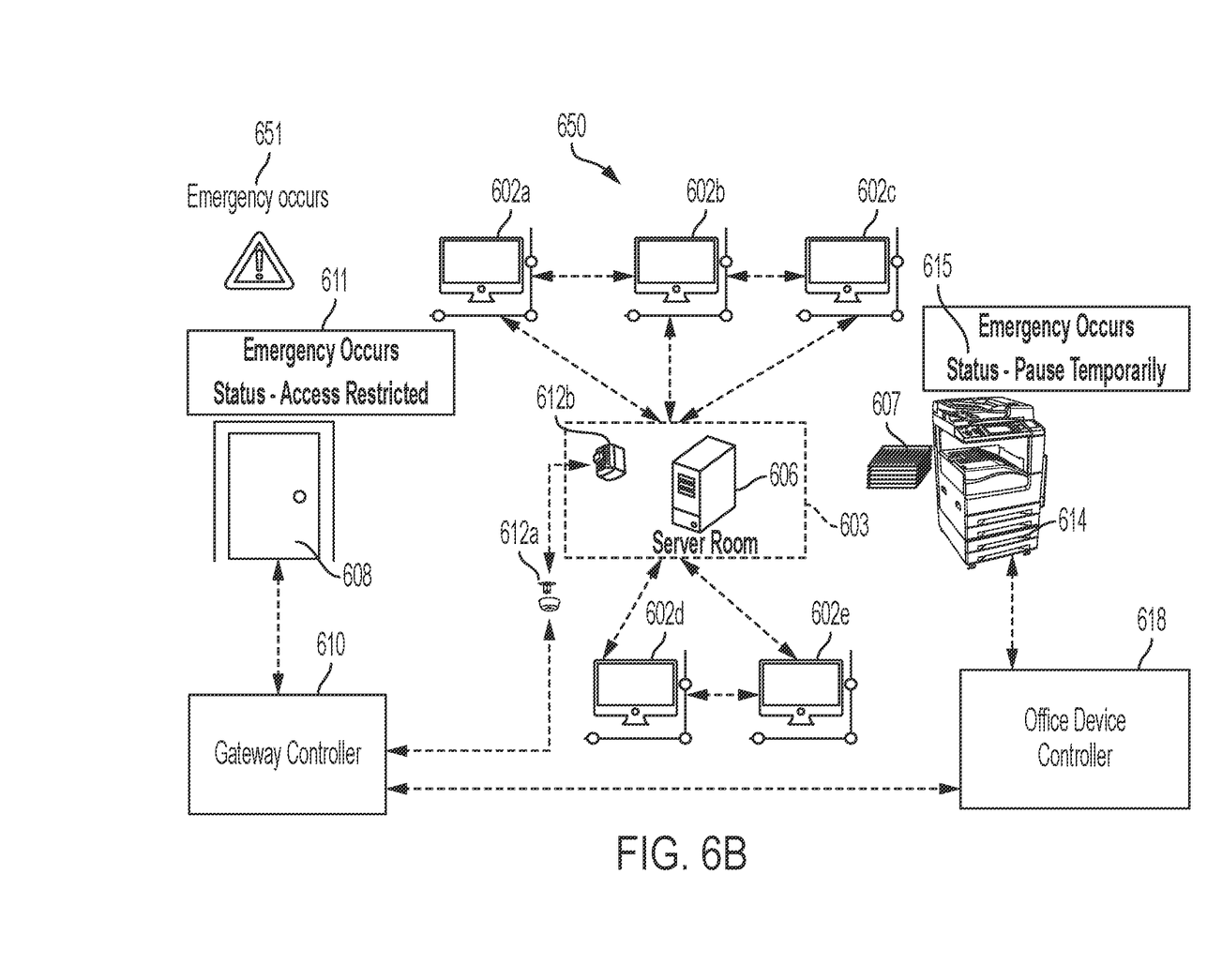

For better clarity, an exemplary use case scenario for implementing the current disclosure is discussed in conjunction with FIGS. 6A-6B. But it is understood that the disclosure can be implemented for other case scenarios without limiting its scope. The use case scenario shows an office environment in normal operating mode such as 600 of FIG. 6A and office environment in emergency situations such as 650 as shown in FIG. 6B. The environment 600 includes one or more computing devices 602a, 602b, 602c, 602d and 602e (collectively 602), one or more users 604a, 604b, 604c, 604d, and 604e (collectively 604), a server 606, an organization gateway 608, a gateway controller 610, one or more sensors 612a and 612b (collectively 612), a multi-function device 614 and an office device controller 618. In normal operating mode, the users 604 use the organization gateway 608 for entry and/or exit to the office premise/environment 600. As shown, the users 604 use computing devices 602 on day-to-day basis for their work, emails, surfing, research, chats, social interaction and so on. For example, the user 604a uses the computing device 602a, the user 604b uses the computing device 602b, the user 604c uses the computing device 602c, the user 604d uses the computing device 602d and the user 604e uses the computing device 602e. Each of the computing device 602 is communicatively coupled to each other and to the server 606, where the server 606 manages these computing devices 602. Any user 604 or 605 uses the multi-function device 614 for various purposes such as printing a document, scanning a document, copying or the like. For example, the multi-function device 614 is printing a document of the user 605 and the user 605 comes at the multi-function device 614 to collect his printed document 607.

The one or more sensors 612 are placed at multiple locations such as 612a is installed in an open area where the users 604d and 604e sit and 612b is installed in a server room 603 within the office environment 600. For example, the sensors 612 may be fire sensors. The sensors 612 continuously sense activities in the environment 600 to detect an emergency. In case of no emergency, access to the organization gateway 608 remains open. For example, the status of the organization gateway 608 as shown is "Access Open" (marked as 609). Similarly, the multi-function device 614 continues to perform its regular operation such as printing, copying, scanning and so on, and the status of the multi-function device 614 may be shown as "working" (marked as 613). The status may be shown as online. These are two examples, the status of multi-function device 614 may be any status to indicate that the multi-function device 614 is functioning. The status of the multi-function device 614 can be shown via its user interface.

As per the case scenario shown in FIG. 6B, it can be considered that the sensors 612 detect emergency. Upon emergency detection (shown via 651), an evacuation plan is executed where all users or other personnel associated with the organization are asked to evacuate the office premise 650 immediately. For example, the users (604a, 604b, 604c, 604d, 604e, and 605 shown in FIG. 6A), have left the office premise. As seen clearly, the user 605 (FIG. 6A) earlier standing close to the multi-function device 614 has left his printed documents 607 at the multi-function device 614 due to the emergency. The sensors 612 send emergency signals to the gateway controller 610 and to the office device controller 618.

Once office premise is empty, the gateway controller 610 restricts access to the organization gateway 608 such that no employees/users can enter the office premise. As shown, the status of the organization gateway 608 may be Access restricted (marked as 611) i.e., only emergency response personnel may enter. The access to the organization gateway 608 is restricted till the emergency ends. Based on status of access to the organization gateway, the office device controller 618 disables functioning of the multi-function device 614 i.e., the multi-function device 614 stops/pauses printing temporarily. As a result, the status of the multi-function device 614 is "Pause Temporarily" (shown via 615). The office device controller 618 continuously checks with the gateway controller 610 for its status.

When the status of the organization gateway 608 is back to "Access Open", the office device controller 618 enables again the multi-function device 614, i.e., the multi-function device 614 resumes printing from where it was left. The scenario when the emergency ends is shown in 670 of FIG. 6C. As per FIG. 6C, all users 604 and 605 are back in the office premise. The status of the multi-function device 614 is "Resume" (shown as 671). The multi-function device 614 resumes printing the job of the user 605 and prints remaining pages (marked as 673) left before the emergency.

Figure 6C:
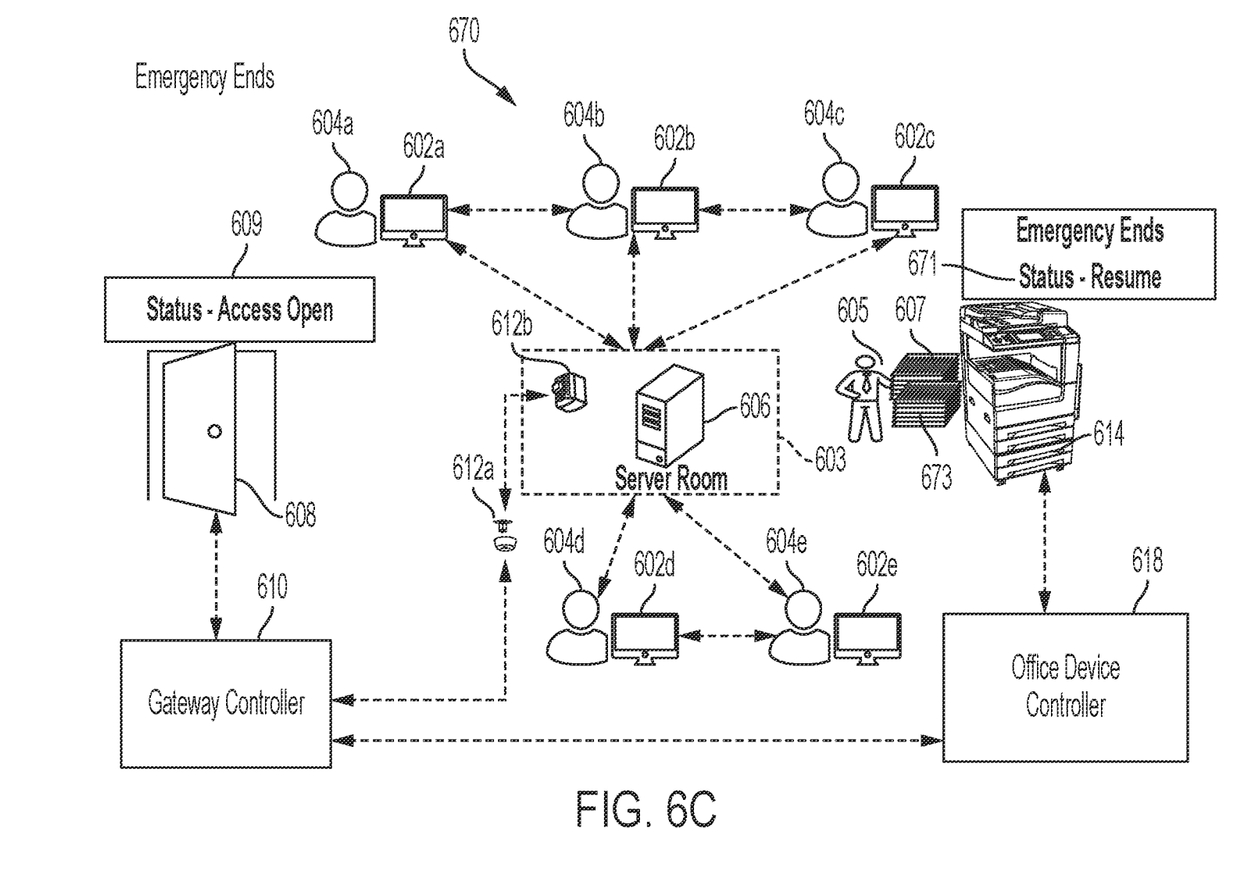

This way, the office device controller 618 stops/controls functioning of the multi-function device 614 such that the multi-function device 614 does not keep running in emergency situations and resumes functioning when the emergency ends.

The disclosure discloses methods and systems for automatically managing office devices in emergencies in an organization. Various examples of the office devices can be printers, scanners, copiers, multi-function devices, or the like. For simplicity, the disclosure is discussed with multi-function device as an example, but the disclosure is applicable to all types of office devices. The methods and systems disclose 2-way communication with the multi-function device, where the multi-function device is notified when the emergency starts as well as notified when the emergency ends. The methods and systems consider status of access to organization gateway post receiving emergency signals and hence chances of discrepancies (i.e., false emergencies) in determining emergencies are avoided. Moreover, the methods and systems capture information immediately if there are any faults/problems in sensor-based models to determine emergencies. As a result, the methods and systems follow an accurate approach in determining emergencies. Further, the methods and systems provide an efficient way of managing multiple devices in an office and, for example, disabling printing across a group of printers in one go. Additionally, the methods and systems provide a convenient way to remotely manage these office devices (disable or enable) when physical access to these devices is not possible. The methods and systems protect all multi-function devices whether far or near with critical information and notification instantly.

Note that throughout the above description, numerous references may be made regarding servers, services, engines, modules, interfaces, portals, platforms, or other systems formed from computing devices. It should be appreciated that the use of such terms is deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as receiving, enabling, disabling, sending, ascertaining, or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in a transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for managing one or more multi-function devices during an emergency in an organization, the method comprising:
   receiving one or more emergency signals from one or more sensors installed within the organization;
   based on the one or more emergency signals, checking status of access to an organization gateway in order to ascertain the occurrence of the emergency, wherein occurrence of the emergency is ascertained when access to the organization gateway is disabled; and
   based on the ascertainment, automatically disabling the one or more multi-function devices.

2. The method of claim 1, wherein an end of the emergency is determined when access to the organization gateway is enabled.

3. The method of claim 1, further comprising continuously checking status of access to the organization gateway to ascertain the occurrence of the emergency or end of the emergency.

4. The method of claim 1, wherein disabling the one or more multi-function devices comprises disabling functionalities of the one or more multi-function devices and access to the one or more multi-function devices.

5. The method of claim 1, wherein the one or more multi-function devices are disabled temporarily till the emergency ends.

6. The method of claim 1, further comprising enabling the one or more multi-function devices, when the emergency ends.

7. The method of claim 1, further comprising generating a notification for one or more users when occurrence of the emergency is ascertained.

8. The method of claim 1, further comprising generating a notification for one or more users when an end of the emergency is determined.

9. A system for managing one or more multi-function devices during an emergency in an organization, the system comprising:
   one or more sensors for:
      detecting emergency within the organization;
      upon detection, sending one or more emergency signals to an organization gateway access system and an office device controller;
   the organization gateway access system for controlling access to an organization gateway based on the one or more emergency signals;
   the office device controller for:
      receiving the one or more emergency signals from the one or more sensors;

based on the one or more emergency signals, checking status of access to the organization gateway to ascertain the occurrence of an emergency, wherein occurrence of the emergency is ascertained when access to the organization gateway is disabled; and based on the ascertainment, disabling the one or more multi-function devices; and one or more multi-function devices communicatively, for performing one or more imaging functionalities.

10. The system of claim 9, wherein an end of the emergency is determined when access to the organization gateway is enabled.

11. The system of claim 9, wherein the office device controller continuously checks status of access to the organization gateway to ascertain the occurrence of the emergency or end of the emergency.

12. The system of claim 9, wherein disabling the one or more multi-function devices comprises disabling functionalities of the one or more multi-function devices and access to the one or more multi-function devices.

13. The system of claim 9, wherein the one or more multi-function devices are disabled temporarily till the emergency ends.

14. The system of claim 9, wherein the office device controller enables the one or more multi-function devices, when the emergency ends.

15. The system of claim 9, wherein the office device controller generates a notification for one or more users.

16. An office device controller for managing one or more multi-function devices during an emergency in an organization, the office device controller is for:

checking status of access to an organization gateway in order to ascertain the occurrence of an emergency, based on one or more emergency signals, wherein occurrence of the emergency is ascertained when access to the organization gateway is disabled; and based on the ascertainment, automatically disabling the one or more multi-function devices.

17. The office device controller of claim 16 further enables the one or more multi-function devices again, when the emergency ends.

18. The office device controller of claim 16 continuously checks status of access to the organization gateway to ascertain the occurrence of the emergency or end of the emergency.

* * * * *